United States Patent [19]

Shaw, Jr.

[11] Patent Number: 4,480,917

[45] Date of Patent: Nov. 6, 1984

[54] FLOAT GLASS RIBBON MONITOR ENHANCEMENT METHOD AND APPARATUS

[75] Inventor: Hugh E. Shaw, Jr., Crystal City, Mo.

[73] Assignee: PPG Industries, Inc., Pittsburgh, Pa.

[21] Appl. No.: 351,702

[22] Filed: Feb. 24, 1982

[51] Int. Cl.³ .............................................. G01N 21/21
[52] U.S. Cl. ...................................... 356/364; 65/158
[58] Field of Search ................ 356/364, 369, 370, 43; 350/394, 395, 396, 399; 250/225; 65/99.2, 99.3, 99.6, 158

[56] References Cited

U.S. PATENT DOCUMENTS 3,462,224  8/1969  Woods et al. .................. 356/43 X
4,008,062  2/1977  Nishikori et al. ................. 65/158
4,020,695  5/1977  Roney ........................... 356/43 X
4,303,435  12/1981  Sleighter ....................... 65/158 X

OTHER PUBLICATIONS

Worthing, A. G., "Temperature Radiation Emissivities and Emittances," from Temperature; Its Movement and Control in Science and Industry, Reinhold, 1941, pp. 1164–1187.

Primary Examiner—Vincent P. McGraw
Assistant Examiner—Matthew W. Koren
Attorney, Agent, or Firm—Dennis G. Millman

[57] ABSTRACT

Monitoring of the glass ribbon edge location in a float glass forming chamber is expedited by enhancing contrast between the glass and the molten metal on which it floats by viewing emitted radiation through a horizontal polarizing filter from adjacent areas of the glass and metal in a region shaded from reflected light.

8 Claims, 1 Drawing Figure

FLOAT GLASS RIBBON MONITOR ENHANCEMENT METHOD AND APPARATUS

BACKGROUND OF THE INVENTION

In the float process for forming flat glass, a stream of molten glass is delivered onto a pool of molten metal (usually tin) within a float forming chamber where the molten glass is formed into a ribbon of desired thickness. In controlling the float forming process, it is desirable to monitor precisely the location of the edges of the glass ribbon floating on the molten metal. Because of the high temperatures involved in the float forming process (typically about 600° C. to 1100° C.) and the presence of heating means within the forming chamber, the glass and the tin and interior elements of the forming chamber emit a considerable amount of visible radiation, thereby rendering optical detection of the glass ribbon edge difficult. In other words, the brightness of the float chamber interior often obscures the glass/tin interface. Light filtering and polarizing devices have been employed to render the glass/tin interface observable, but contrast between the glass and the tin surfaces is not as great as would be desired.

SUMMARY OF THE INVENTION

The present invention provides enhancement of contrast between the glass surface and the tin surface in an optical arrangement for monitoring the location of the glass ribbon in a float forming process. The contrast enhancement is achieved by sighting at an angle toward an edge portion of the glass ribbon and the adjacent tin surface in a region where both the glass and the adjacent tin surfaces are shaded from background reflected radiation. The shading is effected by a non-emitting body within the forming chamber, such as a cooler. The image emitted by the sighted portion of the glass/tin interface is passed through a polarizing filter whose polarization direction is horizontal before being received by optical sensor means (e.g., the human eye or a television camera). The image thus received will show the tin surface nearly black and the glass surface bright with a distinct line of contrast therebetween. The sharp contrast between the glass and the tin expedites precise monitoring of the glass edge location with the aid of stationary reference means.

THE DRAWING

FIG. 1 is a schematic depiction of the float glass ribbon edge detector arrangement of the present invention.

DETAILED DESCRIPTION

Figure 1:
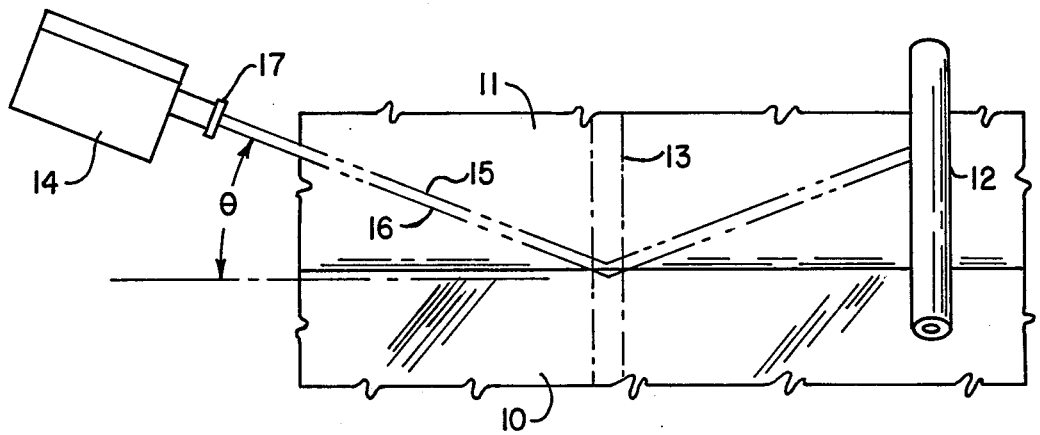

Although not wishing to be bound by a particular theory, it is believed that the phenomenon of the present invention may be explained by a difference in the polarization of light emitted by molten glass and molten metal. It is well known that reflected light from a horizontal surface becomes polarized in the horizontal direction and, therefore, it has been conventional to employ a polarizing filter oriented vertically to reduce glare from horizontal surfaces. Contrary to that conventional use of polarizing filters, it has now been found that a horizontally oriented polarizing filter serves to differentiate between the glass and the metal when observed as radiation sources themselves substantially free from reflected light. It appears that, when observed at an oblique angle, light emitted by molten metal (viz. tin) is polarized vertically, an effect that increases as the angle approaches horizontal. Therefore, at small angles from horizontal, almost no emitted light from the molten metal passes through a horizontal polarizing filter. At the same angles, very little vertical polarization is observed in light emitted from the molten glass, and therefore, a substantial amount of light from the glass passes through the horizontal polarizing filter.

FIG. 1 shows an oblique view across the horizontal top surfaces of a portion of a pool of molten tin 10 and an edge portion of a glass ribbon 11 floating on the molten tin within a float forming chamber. The structure and operation of a float forming chamber are well known in the art and need not be described here. The glass ribbon 11 may be considered to be moving from left to right in FIG. 1. What is monitored by the present invention is the location of the edge of the glass ribbon transverse to the direction of glass travel along the forming chamber.

In accordance with the present invention, the region of the glass ribbon edge being observed should be shaded from reflected images by a non-emitting body within the forming chamber. By non-emitting body is meant a body that is not a source of visible radiation or, in other words, a body that is relatively cool and is absorbing energy from its surroundings and is reradiating an insignificant amount of visible radiation. The preferred example of a non-emitting body for use in the present invention is a cooler such as the section of cooling pipe 12 shown in FIG. 1 and which is commonly employed in float forming chambers to control the temperature of the glass. Other non-emitting bodies may be employed such as the attenuating machines that grip the edges of the glass ribbon or cooled measuring devices that may be extended into the forming chamber. The unwanted reflections are usually from the chamber roof and the glowing electrical heaters therein.

As shown in the drawing, the shaded area 13 from the cooler 12, or other non-emitting body, must extend across both the metal surface and glass surface in the region of observation, whereby a portion 15 of the light rays of the received image will be emitted from the glass surface, and another portion 16 of the light rays of the received image will be emitted from the surface of the molten metal pool. Both portions 15 and 16 of the image are received by an optical receiver such as the television camera 14 shown in the drawing. Other photosensitive receptors may be employed, including the human eye, although for commercial production purposes automated optical sensor means are preferred. The optical sensor is, of course, located outside the forming chamber, and an opening in the forming chamber wall provides a line of sight to the reflected image 13. The angle of observation $\theta$ with respect to the horizontal (see FIG. 1) should, of course, be greater than zero and less than 90°. The polarization effects and, thus, the contrast enhancement, is greater when the angle $\theta$ is less than 45°. An angle of about 15° has been found to be particularly suitable.

An important part of the invention is the provision of a polarizing filter 17 through which the rays 15 and 16 pass before being received by the optical sensor means. The polarizing filter 17 is oriented horizontally, that is, its polarization direction is horizontal so that is passes only horizontally polarized light. Preferably, the polarizing filter comprises a Polaroid film between two sheets of glass for protection. Using the specific embodiment shown and described, it has been found that the edge portion of the glass appears bright, while the adjacent tin appears nearly black.

Other variations and modifications as are known to those of skill in the art may be resorted to without departing from the spirit of the invention as defined by the claims which follow.

I claim:

1. A method of detecting the location of an edge of a glass ribbon being formed on a pool of molten metal in a float glass forming chamber, comprising:

sighting optical sensor means at an oblique angle toward a surface of the glass ribbon near an edge thereof and an adjacent portion of the molten metal surface within the forming chamber so as to receive in the sensor a sighted area of the glass and molten metal surfaces including a virtual image of a non-emitting object within the chamber, and passing the image of the sighted area to the sensor through a polarizing filter oriented horizontally, whereby contrast between the glass and the metal is enhanced in the received image.

2. The method of claim 1 wherein the molten metal comprises tin.

3. The method of claim 1 wherein the angle at which the image is reflected is less than 45° with respect to horizontal.

4. The method of claim 1, 2 or 3 wherein the shading is effected by a non-emitting body within the forming chamber.

5. The method of claim 1 wherein the optical sensor means is a television camera.

6. The method of claim 1 wherein the optical sensor means is the human eye.

7. The method of claim 3 wherein the angle is about 15°.

8. The method of claim 4 wherein the non-emitting body is a cooler.

* * * * *